United States Patent
Ali et al.

(10) Patent No.: US 7,434,014 B2
(45) Date of Patent: Oct. 7, 2008

(54) SYSTEM AND METHOD FOR THE SELF-MIRRORING STORAGE DRIVES

(75) Inventors: Ahmad A. J. Ali, Austin, TX (US);
Farzad Khosrowpour, Pflugerville, TX (US); Kevin T. Marks, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 11/473,955

(22) Filed: Jun. 23, 2006

(65) Prior Publication Data

US 2007/0300027 A1    Dec. 27, 2007

(51) Int. Cl.
*G06F 12/16* (2006.01)
(52) U.S. Cl. .................. 711/162; 711/114; 711/162
(58) Field of Classification Search .................. None
See application file for complete search history.

(56) References Cited

U.S. PATENT DOCUMENTS

| | | | |
|---|---|---|---|
| 7,296,116 B2* | 11/2007 | Davis et al. | 711/114 |
| 2005/0027900 A1* | 2/2005 | Pettey | 710/22 |
| 2005/0125616 A1* | 6/2005 | Johnson et al. | 711/162 |
| 2006/0155928 A1* | 7/2006 | Mimatsu | 711/112 |

* cited by examiner

*Primary Examiner*—Than Nguyen
(74) *Attorney, Agent, or Firm*—Baker Botts L.L.P.

(57) ABSTRACT

A system and method is disclosed for establishing a mirror configuration in a storage network. The storage network includes two storage drives that are coupled to one another according to a Serial Attached SCSI storage network interface. The storage drives determine whether the storage drives are coupled to one another. If it is determined that the storage drives are coupled to one another, the storage drives are configured in a mirror configuration in which write commands received at one of the drives are mirrored to the other drive.

20 Claims, 3 Drawing Sheets

SYSTEM AND METHOD FOR THE SELF-MIRRORING STORAGE DRIVES

TECHNICAL FIELD

The present disclosure relates generally to computer systems and information handling systems, and, more particularly, to a system and method for the self-mirroring of storage drives.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may comprise a storage network that includes a storage array. Drive mirroring, including RAID Level 1 drive mirroring, is used to achieve data redundancy for improved data protection and availability. The mirroring function is often performed in a dedicated storage controller within the host. By placing the mirroring function within the responsibility of a dedicated storage controller, the processor of the host does not have to perform the mirroring function, thereby saving CPU cycles in the host processor. Storage controllers, however, are often costly as compared with standard disk controllers. In addition, performing a mirroring function consumes double the interconnect bandwidth of a write in a non-mirrored storage environment.

SUMMARY

In accordance with the present disclosure, a system and method is disclosed for establishing a mirror configuration in a storage network. The storage network includes two storage drives that are coupled to one another according to a Serial Attached SCSI storage network interface. The storage drives determine whether the storage drives are coupled to one another. If it is determined that the storage drives are coupled to one another, the storage drives are configured in a mirror configuration in which write commands received at one of the drives are mirrored to the other drive.

The system and method disclosed herein is technically advantageous because it provides for a mirror configuration in the drives without the necessity of using a disk controller that includes a mirroring function. Instead, the mirroring function is provided by the drives themselves without the involvement of a disk controller to manage the mirror configuration in the drives. The system and method disclosed herein is also advantageous because it provides for the execution of the mirrored write functions in an atomic fashion. After a first drive receives the write command, the first drive does not confirm that it has completed the write command until both the first drive and the second drive have completed the write command. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
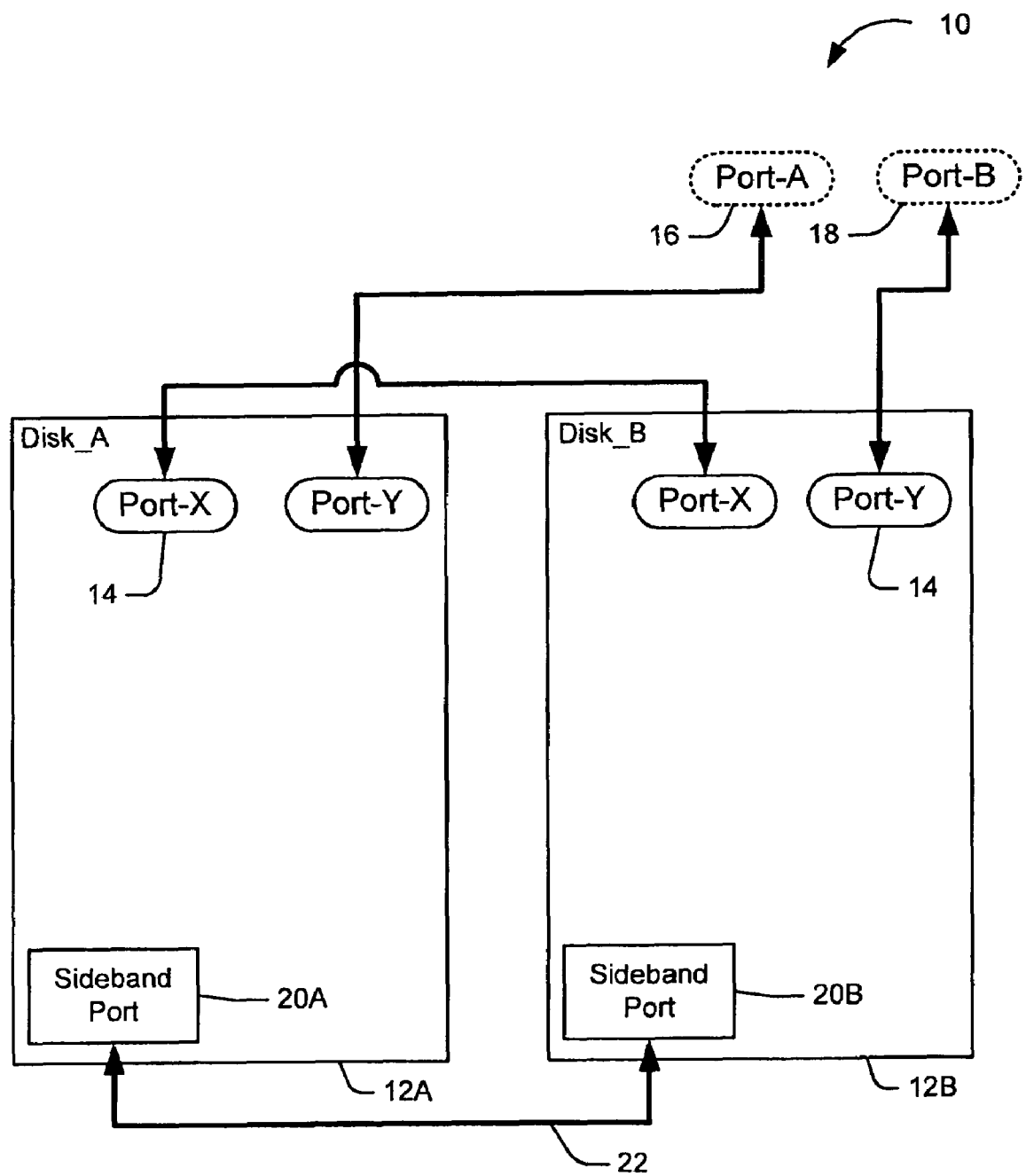
FIG. 1 is a diagram of a storage network.

Shown in FIG. 1 is a diagram of a network 10, which may be configured according to a Serial Attached SCSI (SAS) storage network interface and communications protocol. SAS storage networks are characterized as having a serial, point-to-point architecture and improved data integrity, as compared with parallel SCSI storage networks. Network 10 includes two SAS drives 12A and 12B. Each drive includes two ports 14. The ports of each drive 12 are identified as Port X and Port Y. Also shown in network 10 are Port A, which is identified at 16, and Port B, which is identified at 18. Port A and Port B are external to drives 12 and comprise ports of a host device in network 10. In the example of FIG. 1, Port A is coupled to Port Y of drive 12A, and Port B is coupled to Port Y of drive 12B.

Drives 12A and 12B are coupled to one another. Port X of each of drives 12 are coupled to one another. Each drive 12 includes a sideband communications port 20. A sideband communications link 22 is coupled between the communications ports 20 of drives 12. Sideband communications link 22 may comprise a low-bandwidth connection between interposer cards of each drive. An interposer card can be configured on each drive to include a communications port 20. The communications link 22 need not be an SAS link.

Drives 12 are configured as mirrors of one another. In order to establish a two-drive mirror, each drive 12 must informed of the presence of the existence of the peer drive and the existence of a mirror relationship between the two drives. One method for identifying each drive of the presence of a mirror drive is through the identification that a port of the drive is coupled to the port of another drive. Each port may use the IDENTIFY address frame of the SAS protocol to determine that a port of the drive is coupled to a port of another drive and that the port is both an SAS initiator and an SAS target. If a drive determines that one of its ports is coupled to another drive, then the drive knows that it is part of a mirror. Similarly, a drive determine that one if its ports is coupled to a port of another drive if it is determined that the port on the drive is both an SAS initiator and an SAS target. As an alternative to determining if a mirror relationship through an analysis of whether the ports of the drives are coupled to each other, the drives may also communicate with one another through the sideband communications link 22. The drives may notify one another through a communication passed through the sideband communications link 22 that the drives are to be configured as a mirror. This communication may be initiated by one of the drives or may be transmitted by one of the drives in response to a query from the other of the drives.

Figure 2:
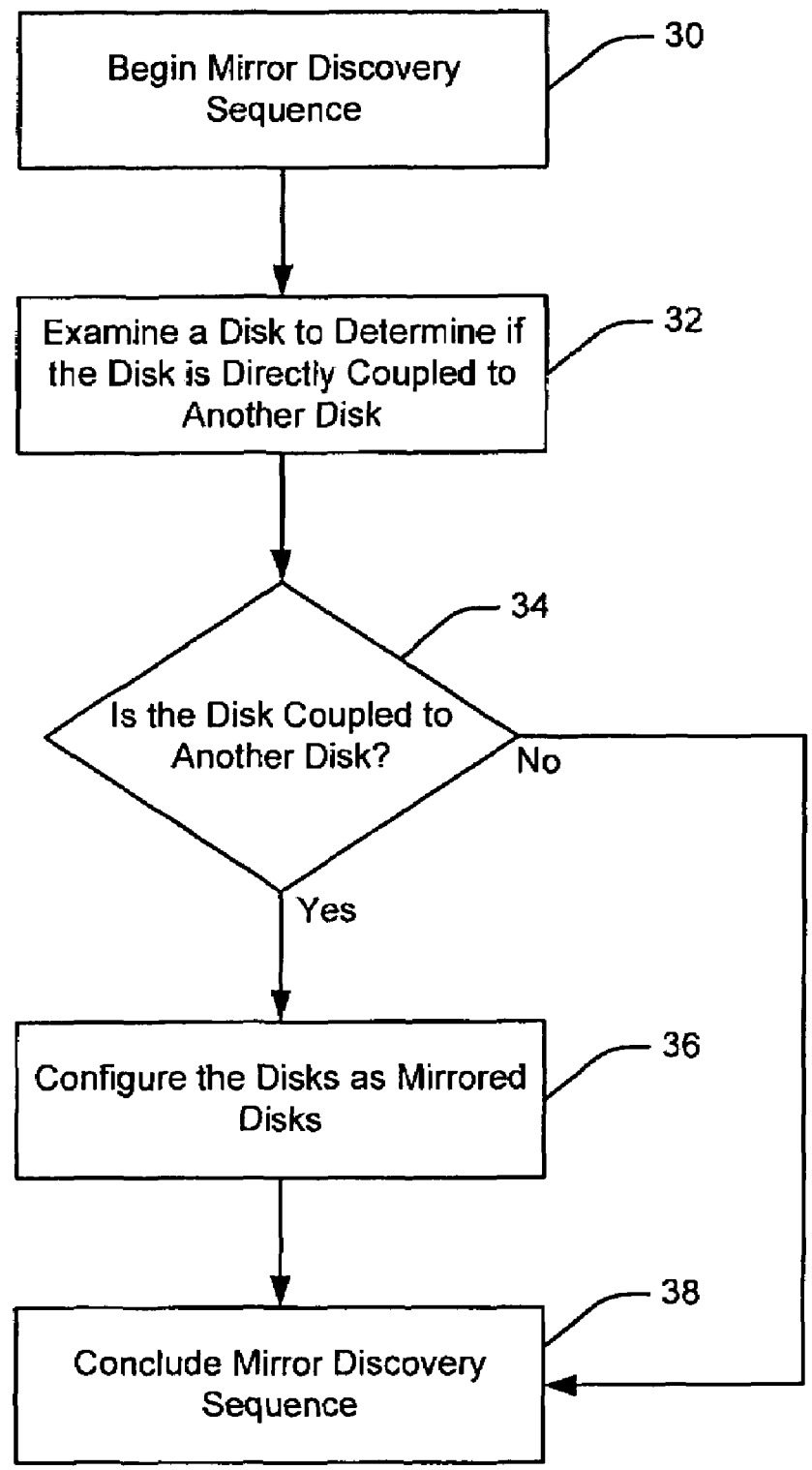
FIG. 2 is a flow diagram of a sequence for completing a mirror discovery sequence in which a drive determines if it is part of a mirror.

Shown in FIG. 2 is a flow diagram of a sequence for completing a mirror discovery sequence in which a drive determines if it is part of a mirror. At step 30, the mirror discovery sequence begins. At step 32, the disk determines if it is directly coupled to another disk. If it is determined at step 34 that the disk is not coupled to another disk, the flow diagram branches from step 34 to step 38, where the mirror discovery sequence concludes. If it is determined at step 34 that the disk is coupled to another disk, the disks are configured as mirrored disks at step 36. Following step 36, the mirror discovery sequence concludes at step 38. In this example, the step of determining if there is a mirror relationship between the drives is accomplished by determining if the drives are coupled to one another through an SAS port of the drives. As an alternative, steps 32 and 34 of FIG. 2 could be accomplished according to a sequence in which a communication is passed through the sideband communications link 22 to determine if the drives are to be configured as a mirror.

Figure 3:
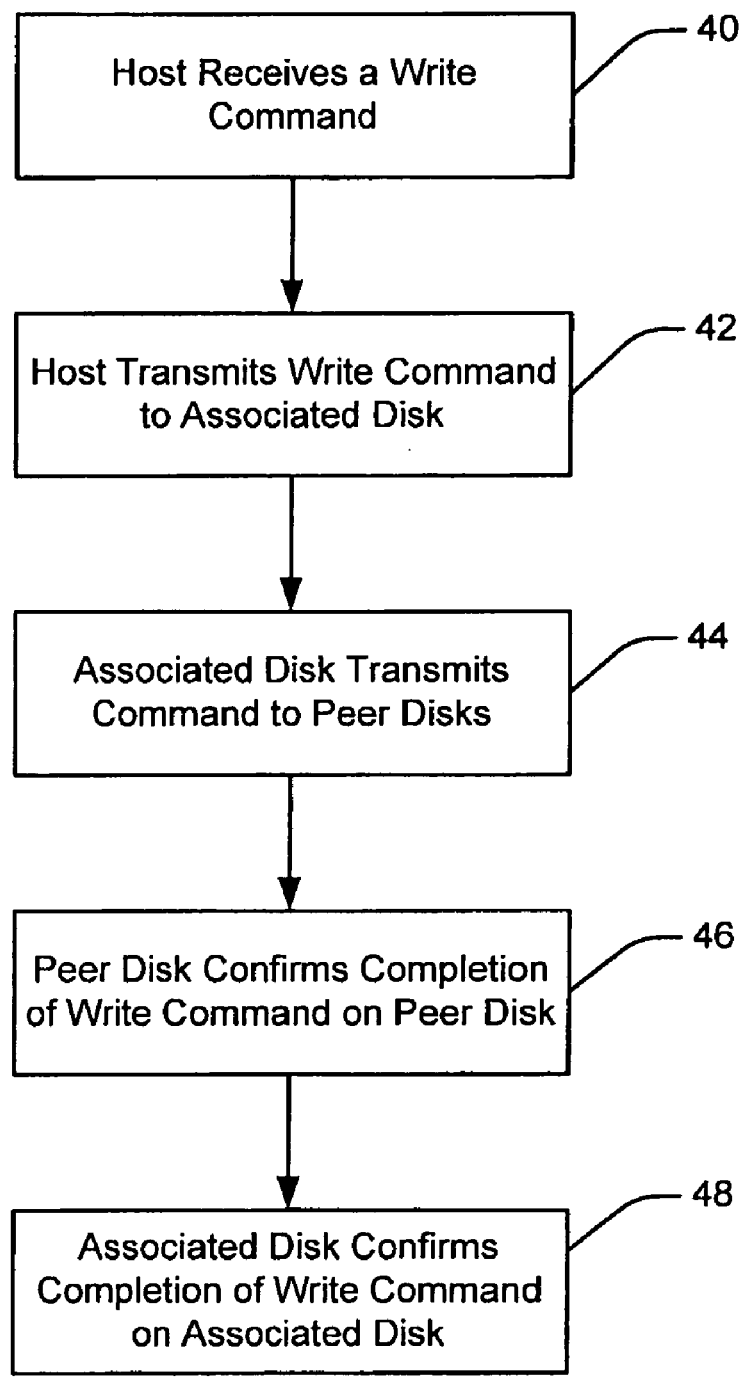
FIG. 3 is a flow diagram of a method for mirroring write commands in the drives of the storage network.

The configuration of the disks as mirrors and the mirroring sequence is set out in FIG. 3. At step 40, the host receives a write command, and, at step 42, the host transmits the write command to the disk associated with the host. As an example, and with reference to FIG. 1, the host associated with Port A transmits write commands to Port Y of drive 12A, and the host associated with Port B transmits write commands to Port Y of drive 12A. At step 44, after receiving the write command, the drive transmits the write command to the peer drive. If the write command were transmitted to drive 12A, for example, drive 12A would transmit the write command to drive 12B. The write command is transmitted from drive 12A to drive 12B through port X of each of the drives. After the peer disk completes the write command at the peer disk, the peer disk notifies the other disk at step 46 that the peer disk has completed the write command. In the continuing example, drive 12B notifies drive 12A when drive 12B has completed the write command. At step 48, the disk that received the write command completes the write command and notifies the host that the write command has been completed. In this example, the drive 12A notifies the host that the drive 12A has completed the write command. In this manner, the completion of the write command between the two drives is atomic in nature. The drive that first receives the write command does not notify the host that the write command is complete until the write command has been executed on both on both drives of the mirror.

The system and method disclosed herein provides for the creation of a mirror configuration in the drives without the necessity of a storage controller in the host that configures the data in the drives according to a mirror configuration. Instead, the drives themselves atomically transmit data and write commands between themselves to mirror the data between the drives, thereby eliminating the need for a host-based storage controller to manage the data-mirroring process.

Although the present disclosure has been described in detail, it should be understood that various changes, substitutions, and alterations can be made hereto without departing from the spirit and the scope of the invention as defined by the appended claims.

What is claimed is:

1. A method for establishing a mirror configuration between first and second storage drives, wherein each drive includes multiple ports, comprising:
    at a first storage drive, determining if a port of the first drive is coupled to a port of the second drive;
    if a port of the first drive is determined to be coupled to a port of the second drive, configuring the first and second drives in a mirror configuration; and
    wherein if the port of the first drive is not determined to be coupled to the port of the second drive, the first and second drives are not configured in a mirror configuration.

2. The method for establishing a mirror configuration between first and second storage drives of claim 1, wherein the first drive and the second drive are each coupled to a common host, and wherein a mirror configuration is created in the drives without the necessity of a storage controller in the host controlling the allocation of data in the drives according to a mirror configuration.

3. The method for establishing a mirror configuration between first and second storage drives of claim 1, wherein the drives are coupled to one another according to a Serial Attached SCSI storage protocol.

4. The method for establishing a mirror configuration between first and second storage drives of claim 3, wherein the determination of whether a port of the first drive is coupled a port of the second drive is made through an analysis of whether a port is both an SAS initiator port and an SAS target port.

5. The method for establishing a mirror configuration between first and second storage drives of claim 3, wherein the determination of whether a port of the first drive is coupled a port of the second drive is made through an analysis of the IDENTIFY address frame passed between the two ports.

6. The method for establishing a mirror configuration between first and second storage drives of claim 1, wherein the determination of whether a port of the first drive is coupled a port of the second drive is made in a communication passed in a sideband communications link established between the first drive and the second drive.

7. The method for establishing a mirror configuration between first and second storage drives of claim 1,
    wherein the first drive and the second drive are each coupled to a common host, and wherein a mirror configuration is created in the drives without the necessity of a storage controller in the host controlling the allocation of data in the drives according to a mirror configuration; and wherein the drives are coupled to one another according to a Serial Attached SCSI storage protocol and wherein the determination of whether a port of the first drive is coupled a port of the second drive is made through an analysis of the IDENTIFY address frame passed between the two ports.

8. The method for establishing a mirror configuration between first and second storage drives of claim 1,
   wherein the first drive and the second drive are each coupled to a common host, and wherein a mirror configuration is created in the drives without the necessity of a storage controller in the host controlling the allocation of data in the drives according to a mirror configuration;
   wherein the drives are coupled to one another according to a Serial Attached SCSI storage protocol and wherein the determination of whether a port of the first drive is coupled a port of the second drive is made through an analysis of the IDENTIFY frame passed between the two ports.

9. The method for establishing a mirror configuration between first and second storage drives of claim 1,
   wherein the first drive and the second drive are each coupled to a common host, and wherein a mirror configuration is created in the drives without the necessity of a storage controller in the host controlling the allocation of data in the drives according to a mirror configuration; and
   wherein the determination of whether a port of the first drive is coupled a port of the second drive is made in a communication passed in a sideband communications link established between the first drive and the second drive.

10. A storage network, comprising:
    a host,
    a first storage drive;
    a second storage drive, wherein each of the first storage drive and the second storage drive includes multiple ports and wherein one of the ports of the first storage drive and one of the ports of the second storage drive are coupled to the host;
    wherein the first storage drive and the second storage drive are operable to determine if a port of the first drive is coupled to a port of the second drive and to configure the drives in a mirror configuration if it is determined that a port of the first drive is coupled to a port of the second drive.

11. The storage network of claim 10, wherein the mirror configuration is created in the storage drives without the necessity of a storage controller in the host controlling the allocation of data in the drives according to a mirror configuration.

12. The storage network of claim 10, wherein the storage drives are coupled to one another according to a Serial Attached SCSI storage protocol.

13. The storage network of claim 12, wherein the determination of whether a port of the first storage drive is coupled a port of the second storage drive is made through an analysis of whether a port is both an SAS initiator port and an SAS target port.

14. The storage network of claim 12, wherein the determination of whether a port of the first storage drive is coupled a port of the second storage drive is made through an analysis of the IDENTIFY frame passed between the two ports.

15. The storage network of claim 10, further comprising a sideband communications link coupled between the first storage drive and the second storage drive, wherein the determination of whether a port of the first storage drive is coupled a port of the second storage drive is made in a communication passed in a sideband communications link established between the first storage drive and the second storage drive.

16. The storage network of claim 10,
    wherein a mirror configuration is created in the storage drives without the necessity of a storage controller in the host controlling the allocation of data in the storage drives according to a mirror configuration; and
    wherein the storage drives are coupled to one another according to a Serial Attached SCSI storage protocol and wherein the determination of whether a port of the first storage drive is coupled a port of the second storage drive is made through an analysis of the IDENTIFY address frame passed between the two ports.

17. A method for establishing a mirror configuration in a storage network and completing a mirrored write command, comprising:
    at a first drive, determining if a port of the first drive is coupled to a port of the second drive;
    if a port of the first drive is determined to be coupled to a port of the second drive, configuring the first and second drives in a mirror configuration; and
    following the configuration of the first and second drives in a mirror configuration,
    receiving at the first drive a write command;
    completing the write command at the first drive; and
    completing the write command at the second drive.

18. The method for establishing a mirror configuration in a storage network and completing a mirrored write command of claim 17, wherein the first drive and the second drive are each coupled to a common host, and wherein a mirror configuration is created in the drives without the necessity of a storage controller in the host controlling the allocation of data in the drives according to a mirror configuration.

19. The method for establishing a mirror configuration in a storage network and completing a mirrored write command of claim 17, wherein the determination of whether a port of the first drive is coupled a port of the second drive is made in a communication passed in a sideband communications link established between the first drive and the second drive.

20. The method for establishing a mirror configuration in a storage network and completing a mirrored write command of claim 17, wherein the drives are coupled to one another according to a Serial Attached SCSI storage protocol.

* * * * *